Patented Sept. 27, 1938

2,131,073

UNITED STATES PATENT OFFICE 2,131,073

MANUFACTURE OF EXPANDED RUBBER

Dudley Roberts, New York, N. Y., and James S. Reid, Cleveland, Ohio; said Reid assignor to Rubatex Products, Inc., New York, N. Y., a corporation of Delaware No Drawing. Application February 21, 1936, Serial No. 65,062

8 Claims. (Cl. 18—53)

This invention relates to novel methods of manufacturing gas expanded rubber products.

Heretofore in the manufacture of gas expanded rubber products, the rubber dough was first partially vulcanized and partially expanded in the presence of gas under a very high pressure. The gassed rubber dough was then cut to form in order to fit the mold in which it was to be expanded to correspond to the final shape of the product. The mold was then subjected to the final vulcanizing stage during which the gassed rubber dough expanded to fill the mold. Although articles of irregular and complicated shapes could be produced in this manner, many impractical features were encountered. For example, partially vulcanized and partially expanded material had to be cut or otherwise roughly formed to fit a predetermined percentage of the mold volume. A waste of material accompanied this method of subdividing smaller shapes from larger forms which were more economically produced in the preliminary stages.

We have discovered that by subjecting small pellets or pills of rubber dough to the partial vulcanization and partial expansion stage during high pressure gassing, that these pellets may be combined with a latex or other suitable cement to form a liquid like or plastic mass which may be poured into molds of complex shapes. The molds will be readily filled to a predetermined level dependent upon the final expansion desired during the final vulcanization stage. The individual gassed pellets expand during the final vulcanization to completely fill the mold and a uniform gas expanded rubber product results. The strength of the material compares favorably with products made by prior methods.

Hydrogen sulphide has always been a troublesome by-product in gas expanded rubber and we have found that our present invention produces a gas expanded rubber product which is practically free from the objectionable odors resulting from prior methods.

It is accordingly an object of our invention to provide novel methods for manufacturing gas expanded rubber products.

Another object of our invention is to manufacture gas expanded rubber products using individual pellets.

A further object of our invention is to provide a novel process of manufacturing molded gas expanded rubber products wherein a suitable liquid-like or plastic composition containing partially vulcanized and partially expanded rubber particles is poured into the mold.

Still another object of our invention is to manufacture gas expanded rubber using pellets of gassed rubber which are welded together in the final vulcanization and expansion stage.

An important use for hard gas expanded rubber is as a sound absorbing board such as applied to walls of interiors.

It is well known that a rough rather than a smooth outer surface for said walls greatly increases the acoustic absorption property of said walls. By suitably proportioning the level to which the individual pellets of our present invention are poured in the mold, a finally expanded product will result having an irregular surface due to the individual pellet composition. A roughened or irregular surface product is thereby readily produced.

It is accordingly another object of our present invention to provide a novel method for manufacturing irregular surfaced gas expanded rubber slabs.

These and other objects will become apparent in the following description of our invention.

Our invention is equally well applied to gas expanded rubber products which are either soft or hard. It is also applicable to expanded products having sealed or individual gas cellular structure or where the gas cells are ruptured or otherwise communicate. We shall describe our invention as applied to gas expanded rubber having a sealed cellular structure, although other compositions or materials may be employed as will be evident to those skilled in the art. The process for preparing the rubber dough relating to the manufacture of gas expanded rubber of this type is disclosed in the Denton Patent No. 1,905,269 issued April 25, 1933 and in the application Serial No. 717,550 of Roberts, Scott and Peel, filed March 27, 1934.

As described in the application, the materials and their proportions by weight entering into the composition of the rubber dough are:

| | Per cent |
|---|---|
| Smoked rubber sheets | 40–75 |
| Sulphur | 6–30 |
| Light calcined magnesia | 3–5 |
| Ground gilsonite | 12 |
| Lower melting bituminous substances | 12 |

The ingredients are individually ground and mixed on a mill. The resulting rubber dough is formed into small pellets by means which are not necessary to describe in the present disclosure but are well known to those skilled in the mechanical arts. For example, the rubber dough may readily be extruded into small tubular stock such as rods having a diameter of one-eighth to one-quarter inch. These rods are in turn cut up into small pills or pellets for example one-eighth inch long.

A charge of pellets is placed in a suitable container in a gassing chamber or autoclave and gassed as described in the application above-referred to. An inert gas such as nitrogen is used at a pressure of the order of 2500 pounds per square inch. As there explained, steam is simultaneously admitted to the surrounding walls in the autoclave to provide heat for partially vulcanizing the rubber dough which is in the form of pellets in our present invention to entrap the adsorbed gas.

The pellets are then removed from the container. It may be necessary to cover them with chalk prior to insertion in the gassing chamber to prevent them from adhering or coagulating to insure their individual structure at the end of this stage. Upon removal from the gassing chamber, the pellets increase in size due to the expansion of the gas entrapped within its structure.

In one modification of our invention, we combine the gassed pellets with a latex or other suitable cement known in the art. The latex or cement acts as a binder for the pellets in the final vulcanization stage. Well known vulcanizing fluids may be used as the binder. The pellets and binder are then poured or shovelled to a predetermined level in the mold. This level depends upon several well known factors such as the density of the final product, the hardness of the product surface, and in this invention, also upon the smoothness or roughness of said surface desired as will be hereinafter more fully described. The mold may be of irregular or complicated shape since material will readily conform with these irregularities.

The mold is then subjected to the final vulcanization temperature and final pressure retaining means such as presses for maintaining the predetermined mold shape intact while the expanding rubber within it exerts pressure in filling the mold while it is finally expanded. The product is removed upon cooling of the molds.

As is already established in this art, the ingredients of the composition entering into the product as well as the temperatures and pressures employed in its manufacture determine whether it shall be soft and flexible or rigid and hard in its final form, and we do not intend to be limited thereby. We have found that it is not necessary to employ the binder, cement, latex or extra vulcanizing fluid with the partially vulcanized and partially expanded gassed pellets before their insertion in the mold but that the pellets may be directly placed in the mold and be finally vulcanized to form a uniform product.

A simplification in the manufacture of gas expanded rubber according to our present invention is obtained by employing the principles set forth in the application Serial No. 20,364 of Peel, filed May 8, 1935 wherein the full efficiency of the gassing chamber is utilized by partially vulcanizing the rubber dough before gassing thereof. Accordingly, the rubber dough pellets are first heated for partial vulcanization thereof and then placed in a container which may, for example, be a large cylinder comprising a substantial volume of the gassing chamber of an autoclave, and gassing these pellets at room temperature. The remainder of the present process of this modification is similar to that hereinafter described.

By proper determination of the level to which the mold is filled with the gassed pellets before final expansion, a smooth surface may be had for the end product due to the pressure exerted by the expanding pellets to produce sufficient pressure within the mold so as to produce a homogeneous surface layer adjacent the mold walls due to the rupturing of the cellular structure thereat.

Hardened slabs of gas expanded rubber are employed as acoustic boards for sound absorption purposes. A smooth hardened surface reflects a substantial part of the impinging sound waves. A rough surface greatly reduces this reflection factor permitting increased acoustic absorption efficiency of said walls. Slabs having a rough surface are readily obtainable by our present process. The level to which the molds for these slabs are filled is predetermined so that with the temperatures and other factors used in a preferred manufacture thereof, the level is such as to produce complete vulcanization of the expanded material in the mold so that the internal pressures do not form a homogeneous surface adjacent the mold walls but permit grooves between the expanded pellet structure at the surface. The product, although being uniform throughout will have a surface structure of coarse grain-like appearance.

Hydrogen sulphide gas is generated during the vulcanization of gas expanded rubber, imparting a disagreeable odor to the product. We have found that the hydrogen sulphide odor is practically eliminated from the gas expanded rubber manufactured according to our present invention.

Although we have described several modifications of our invention, further modifications thereof will suggest themselves to those skilled in the art and we do not intend to be limited except as set forth in the following claims.

We claim:
1. A method of making a porous rubber body containing a large number of gas expanded rubber pellets separated from each other by spaces which comprises forming a number of small pellets of rubber; gassing the pellets; mixing the gassed pellets with liquid latex; expanding the mixed mass; and vulcanizing the expanded mass to form an expanded rubber body having a non-objectionable odor.

2. A method of making a porous rubber body containing a large number of gas expanded rubber pellets separated from each other by spaces which comprises forming a number of small pellets of rubber; gassing the pellets; placing the gassed pellets in a mold, expanding the pellets so that a mass of gas expanded rubber pellets separated by spaces is obtained and vulcanizing this expanded porous structure to form an expanded rubber body having a non-objectionable odor.

3. A porous gas expanded rubber structure having a non-objectionable odor comprising a multiplicity of individual gas expanded pellets bonded together with a rubber cement, said gas expanded pellets being separated from each other by spaces.

4. A porous gas expanded rubber structure having a non-objectionable odor comprising a multiplicity of individual gas expanded pellets bonded together with a rubber cement, said gas expanded pellets being held in spaced and permanent engagement with each other with air spaces between the pellets.

5. The method of producing gas expanded rubber bodies which comprises forming small rubber pellets of irregular shape, which shape has no relation to the shape of the final body to be produced; gassing the pellets; partially expanding the gassed pellets; introducing said partially expanded pellets into a mold the shape of the mold having no relation to the shape of the pellets; further expanding the pellets to form a molded body and vulcanizing the molded body to a permanent cure.

6. The method of producing gas expanded rubber bodies which comprises forming small rubber pellets of irregular shape, which shape has no relation to the shape of the final body to be produced; gassing the pellets; partially expanding the gassed pellets; mixing said partially expanded pellets with a binder; introducing said partially expanded pellets and binder into a mold, the shape of the mold having no relation to the shape of the pellets; further expanding the pellets to form a molded body and vulcanizing the molded body to a permanent cure.

7. The method of producing gas expanded rubber bodies which comprises forming small rubber pellets of irregular shape, which shape has no relation to the shape of the final body to be produced; gassing the pellets; partially expanding the gassed pellets; mixing said partially expanded pellets with latex; introducing said partially expanded pellets and latex into a mold, the shape of the mold having no relation to the shape of the pellets; further expanding the pellets to form a molded body and vulcanizing the molded body to a permanent cure.

8. A vulcanized porous closed cell gas expanded rubber structure having a non-objectionable odor comprising a multiplicity of individual vulcanized closed cell gas expanded pellets in the form of a unitary cellular rubber structure in which said individual closed cells retain their identity, said closed cell gas expanded rubber pellets being in such irregular contact with each other that spaces are provided between said pellets.

JAMES S. REID.
DUDLEY ROBERTS.